United States Patent
Sakai

(10) Patent No.: US 9,905,018 B2
(45) Date of Patent: Feb. 27, 2018

(54) IMAGING APPARATUS, IMAGE PROCESSING METHOD, AND MEDIUM

(71) Applicant: Naoki Sakai, Kanagawa (JP)

(72) Inventor: Naoki Sakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 168 days.

(21) Appl. No.: 14/872,223

(22) Filed: Oct. 1, 2015

(65) Prior Publication Data

US 2016/0100146 A1   Apr. 7, 2016

(30) Foreign Application Priority Data

Oct. 7, 2014   (JP) .................................. 2014-206667

(51) Int. Cl.

| | |
|---|---|
| *G06T 7/20* | (2017.01) |
| *H04N 5/235* | (2006.01) |
| *H04N 5/14* | (2006.01) |
| *H04N 9/73* | (2006.01) |
| *H04N 9/07* | (2006.01) |

(52) U.S. Cl.
CPC ........... *G06T 7/2066* (2013.01); *H04N 5/144* (2013.01); *H04N 5/2351* (2013.01); *H04N 9/07* (2013.01); *H04N 9/735* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0076108 A1* | 6/2002 | Konoshima | ............. | G06T 7/248 382/217 |
| 2009/0002517 A1* | 1/2009 | Yokomitsu | ......... | G06K 9/00771 348/223.1 |
| 2011/0026767 A1* | 2/2011 | Miyazaki | ........... | H04N 5/23219 382/103 |
| 2011/0142283 A1* | 6/2011 | Huang | .................... | G06T 7/254 382/103 |
| 2012/0033888 A1* | 2/2012 | Takamori | ............. | G06K 9/3241 382/190 |
| 2013/0343646 A1* | 12/2013 | Hata | ..................... | G06K 9/4652 382/165 |
| 2014/0185931 A1* | 7/2014 | Aoki | ........................ | H04N 1/62 382/167 |

FOREIGN PATENT DOCUMENTS

| | | |
|---|---|---|
| JP | 2002-271638 | 9/2002 |
| JP | 2011-223242 | 11/2011 |
| JP | 2013-192121 | 9/2013 |

\* cited by examiner

*Primary Examiner* — Sath V Perungavoor
*Assistant Examiner* — Janese Duley
(74) *Attorney, Agent, or Firm* — Harness, Dickey & Pierce, P.L.C.

(57) ABSTRACT

An imaging apparatus acquires an image including a still image and a moving image, tracks a position of the object within an image capturing area of the image, records a luminance change within a region of the object being tracked, detects a point having a luminance change amount equal to or greater than a threshold, as a specular reflection area, calculates an object correction value, which is a color correction value of the object, based on color information of the specular reflection area, and corrects color overlap of the image based on the object correction value.

8 Claims, 5 Drawing Sheets

IMAGING APPARATUS, IMAGE PROCESSING METHOD, AND MEDIUM

CROSS-REFERENCE TO RELATED APPLICATIONS

This patent application is based on and claims priority pursuant to 35 U.S.C. §119(a) to Japanese Patent Application No. 2014-206667, filed on Oct. 7, 2014, in the Japan Patent Office, the entire disclosure of which is hereby incorporated by reference herein.

BACKGROUND

Technical Field

The present disclosure relates to an imaging apparatus, an image processing method, and a medium.

Description of the Related Art

In imaging apparatuses such as digital cameras for capturing still images and digital video cameras for capturing moving images, color overlap may occur due to the influence of a light source or the like. To reduce such influence and obtain an image with natural color, color overlap correction is performed on a captured image such as still image or moving image. A correction coefficient (hereinafter, a color correction value) for correcting color overlap is generally calculated from the image data of the captured image.

Especially in a moving image, a color correction value is generally calculated assuming the average value of color information of the entire image to be achromatic color.

In conventional color overlap correction methods, appropriate color overlap correction has sometimes failed to be performed depending on objects. For example, in the case of an image in which a chromatic object occupies the large part of an image capturing area, there has been a problem of erroneously detecting the color information of an object or a background part as the color information of illumination light, and correcting the color information of even an original object.

SUMMARY

Example embodiments of the present invention include an imaging apparatus acquires an image including a still image and a moving image, tracks a position of the object within an image capturing area of the image, records a luminance change within a region of the object being tracked, detects a point having a luminance change amount equal to or greater than a threshold, as a specular reflection area, calculates an object correction value, which is a color correction value of the object, based on color information of the specular reflection area, and corrects color overlap of the image based on the object correction value.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
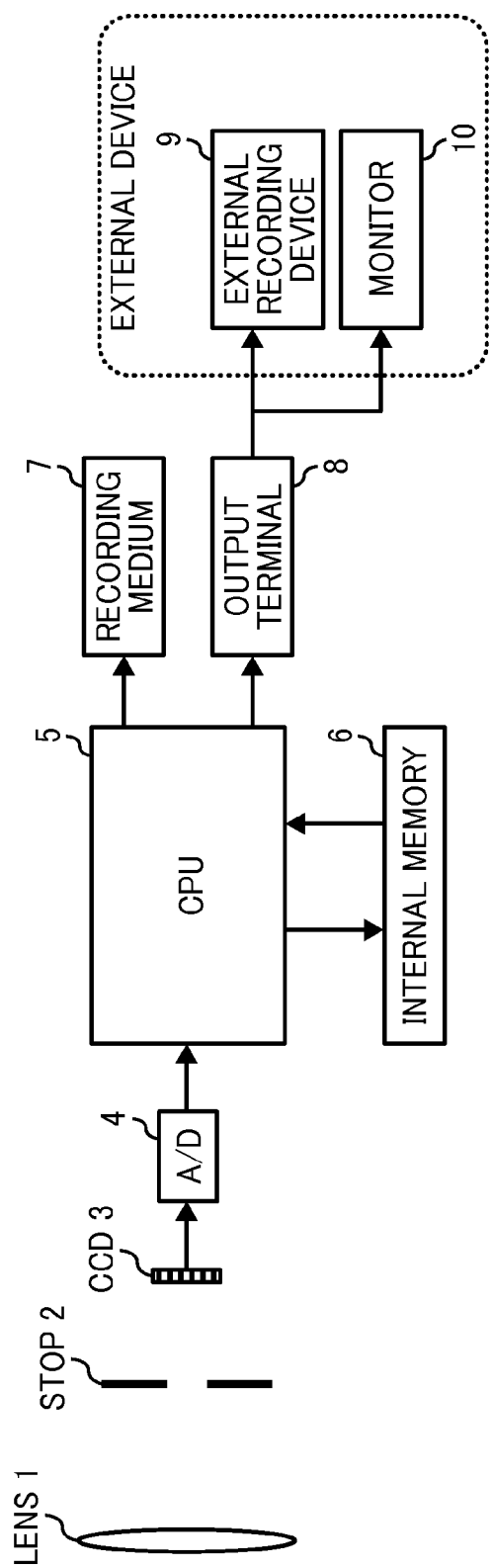
FIG. 1 is a configuration diagram of an imaging apparatus according to a first embodiment of the present disclosure.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, as an embodiment of the present disclosure, an imaging apparatus detects a specular reflection area that emits the shine of an object, from a captured moving image, and executes color overlap correction based on the color information of this region.

Embodiments of the present disclosure will be described in detail with reference to the accompanying drawings.

First Embodiment

The first embodiment is an embodiment of a case in which color overlap correction is executed on a moving image captured by an imaging apparatus in a fixed state. In the present embodiment, an object is assumed to be moving within an image capturing area.

In particular, the present embodiment is supposed to be applied to a monitoring camera. The color of an object can be accurately obtained by accurately executing color overlap correction.

FIG. 1 is a configuration diagram of an imaging apparatus according to the first embodiment of the present disclosure.

The imaging apparatus illustrated in FIG. 1 includes a lens 1, a stop 2, a charge coupled device (CCD) sensor 3, an analogue/digital converter (represented as "A/D" in FIG. 1) 4, a central processing unit (CPU) 5, an internal memory 6, a recording medium 7, an output terminal 8, an external recording device 9, and a monitor 10. The CPU 5 is one example of a processor that controls entire operation of the imaging apparatus of FIG. 1. The internal memory 6 is a memory that stores a control program. One example of the internal memory 6 is a read only memory (ROM). The recording medium 7 is a memory that stores the image data. One example of the recording medium 7 is a flash memory. The external recording device 9 is a memory capable of storing large volume of data that cannot be fully stored in the recording medium 7. One example of the external recording device 9 is a hard disk drive (HDD). The monitor 10 displays a captured image such as a captured video image. One example of the monitor 10 is a liquid crystal display. The lens 1, the stop 2, and the CCD sensor 3 may be collectively referred to as an imaging unit.

The lens 1 focuses light, which is passed through the image capturing area. The stop 2 regulates the amount of focused light. The regulated light then enters the CCD sensor 3. Based on the entered light, the CCD sensor 3 generates an electrical signal of an image due to a photoelectric conversion. The CCD sensor 3, which has color filters with three colors (red, green, and blue (RGB)), outputs signals of RGB three channels. The A/D converter 4 converts an electrical signal of the image that is output by the CCD sensor 3 from an analog signal into a digital signal.

More specifically, each of output signals of RGB channels is converted into a digital signal with an 8-bit (0-255) depth. The CPU 5 executes, on the digital signal received from the A/D converter 4, processing such as color overlap correction to be described below, and conversion into data in a desired format.

The generated data is stored into the recording medium 7. Alternatively, the generated data is output to an external device via the output terminal 8 to be stored into the connected external recording device 9 or displayed on the monitor 10.

Figure 2:
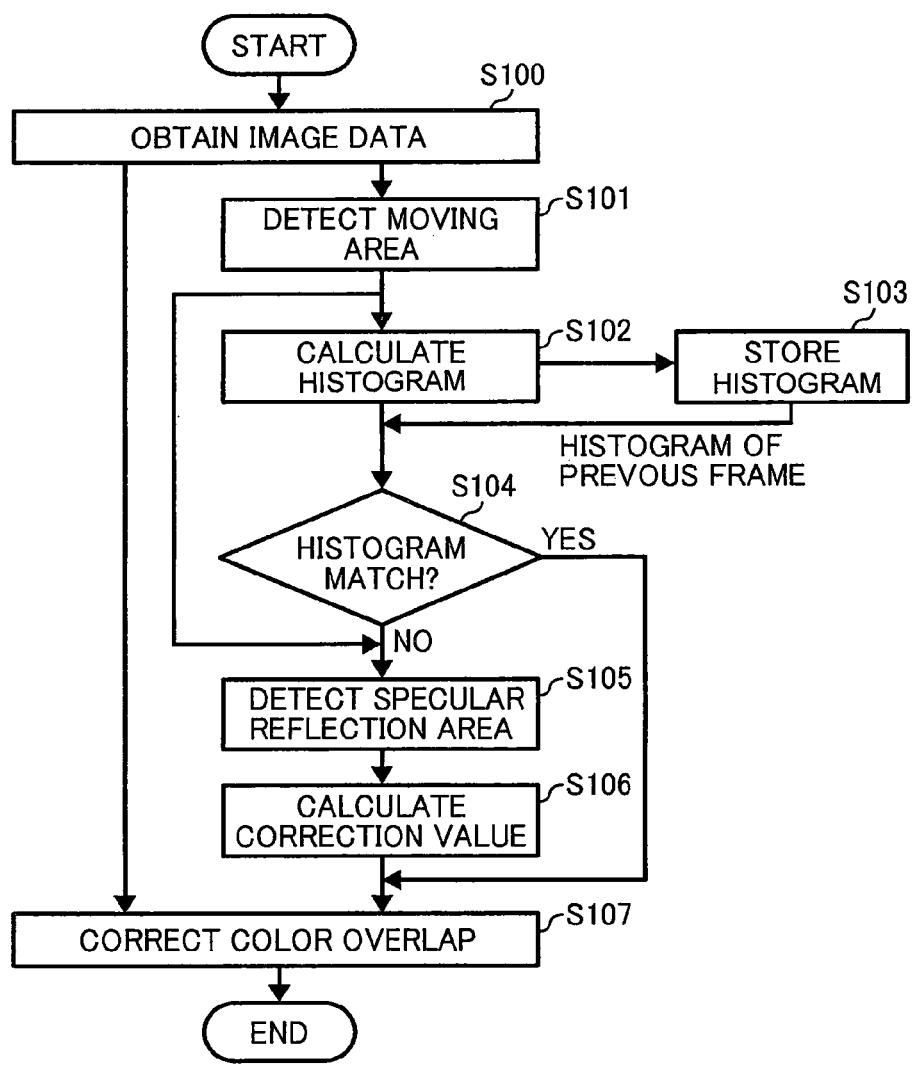
FIG. 2 is a flowchart illustrating operation of performing color overlap correction according to the first embodiment.

FIG. 2 is a flowchart illustrating operation of performing color overlap correction according to the first embodiment.

In the present embodiment, an object moving within an image capturing area at relatively low speed (e.g., walking speed of 4 km/h) is targeted. Specifically, in a captured moving image of an object, the entire object desirably exists within the image capturing area in approximately 10 consecutive frames. If the object moves within the image capturing area at high speed (e.g., vehicular speed of 50 km/h), the number of consecutive frames in which the object is captured decreases. This reduces the probability that a frame containing a specular reflection area that emits shine can be obtained. Thus, it is desirable that the frame rate of a moving image is higher. For example, it is desirable to have 30 frames per second (fps).

The color overlap correction illustrated in FIG. 2 is processing to be executed by the CPU 5 (processor) illustrated in FIG. 1 according to the control program stored in the internal memory 6.

FIG. 2 illustrates processing to be executed on one frame among consecutive frames of a moving image. Actually, the flow illustrated in FIG. 2 is consecutively executed on all the frames so as to correct the color overlap of the entire moving image.

In the processing, before capturing a video image of an object, the CPU 5 acquires a video image previously obtained from the imaging unit, as correction data, and the correction data is stored into the internal memory 6 or the like.

First, in S100, the CPU 5 acquires, as a still image, image data of one frame from among consecutive frames of a moving image captured by the imaging unit. In step S101, a moving region is detected based on the image data of preceding and subsequent frames of the acquired image data, using any desired known differentiation technique, for example, as described below with reference to FIG. 3. For the moving region thereby detected, only the image data of the moving region is extracted. Then, operation proceeds to histogram calculation at S102.

In S102, a histogram of luminance values of the image data of the moving region is calculated. In this step, the histogram is calculated for luminance values of each channel of R, G, and B. The number of bins (division number of a horizontal axis) of the histogram is set to 64, and the width of a bin is set to 4. For example, pixels having luminance values from 0 to 3 are counted as the same luminance value. In addition, in order to eliminate the influence of the sizes of moving regions, a vertical axis (frequency) of the histogram is standardized based on the areas of moving regions. In S103, each calculated histogram information is temporarily stored into a memory such as the internal memory 6.

In step S104, histogram pattern matching is executed using each calculated histogram information. The CPU 5 reads the histogram information of an immediately preceding frame of a frame currently being processed, from a memory such as the internal memory 6. More specifically, pattern matching is executed, for each channel, on the histogram of the frame currently being processed and the histogram of the preceding frame acquired from the memory. In the pattern matching, between the histograms of the two frames, an absolute value of a difference in frequencies of corresponding bins is initially calculated. A threshold is set for the absolute value of the difference, and the presence or absence of a bin having an absolute value equal to or greater than the threshold is determined. Then, position information is acquired to identify which pixel in the moving region the determined point corresponds to. A threshold for determining a specular reflection area is predetermined based on the actual measurement data of angular dependency of a reflectance previously measured for a reference sample.

In the present embodiment, an object is assumed to move within an image capturing area. Thus, an angle of a line connecting the imaging apparatus and the object temporally changes. In other words, by observing a time change of luminance, an angle change of luminance can be estimated.

Here, based on the previously measured reflectance angular dependency of the reference sample, a reflectance under a specular reflection condition and a reflectance under a diffuse reflection condition are determined, and a threshold is determined based on the ratio of these reflectances. Such processing is executed on each channel. If the same pixel has an absolute value exceeding the threshold in all channels, and the number of such pixels is 25 or more, the two histograms are determined to be "mismatch". In the other cases, the two histograms are determined to be "match".

In this step, if the number of pixels having absolute values exceeding the threshold in all the channels is less than 25, in the described-below calculation of a color correction value serving as correction data, a proper correction value cannot be obtained due to the influence such as thermal noise of the CCD sensor 3. Thus, in the present embodiment, the two histograms are determined to be "match" (YES in step S104), and the relevant frame is not used in the calculation of a color correction value. Then, the processing directly proceeds to a color overlap correction execution step S107. On the other hand, if the two histograms are determined to be "mismatch" (NO in step S104), the processing proceeds to a specular reflection area detection step S105.

In step S105, based on the position information acquired in step S104, a specular reflection area is extracted from the moving region. In step S106, a color correction value is calculated using luminance value information of each pixel at the extracted point.

More specifically, in step S106, the luminance value information acquired in step S105 is stored for at most 10 frames. If new luminance value information is acquired, the luminance value information of the oldest frame is deleted. The sums ΣR, ΣG, and ΣB of luminance values of the respective channels are calculated using these pieces of luminance value information of at most 10 frames. Furthermore, color correction values R gain (=ΣG/ΣR) and B gain (=ΣG/ΣB) for adjusting the respective gains of an R channel and a B channel based on a G channel are calculated so as to satisfy a relationship ΣR=ΣG=ΣB.

In step S107, the luminance values of the entire image regions of the R and B channels are respectively multiplied by the color correction values R gain and B gain calculated in step S106, thereby executing color overlap correction.

For example, if a correction value of an object and a color correction value of a background part that are calculated in step S106 differ from each other by a certain value or more, color overlap correction may be performed only on the moving region detected in step S101, using the calculated object correction value.

Figure 3:
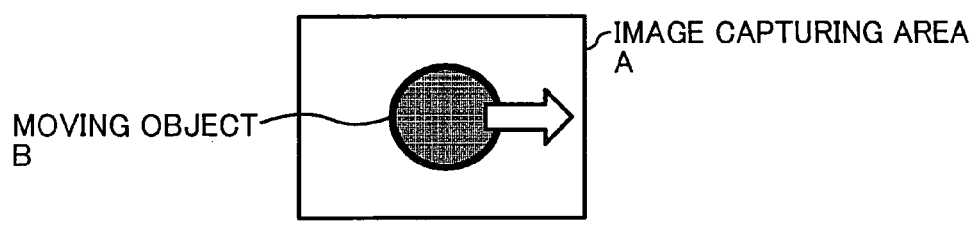
FIG. 3 is an explanatory diagram illustrating an image of a moving object as an object of an imaging apparatus according to an embodiment of the present disclosure.

FIG. 3 is an explanatory diagram illustrating an image of a moving object B as an object of an imaging apparatus.

Figure 4:
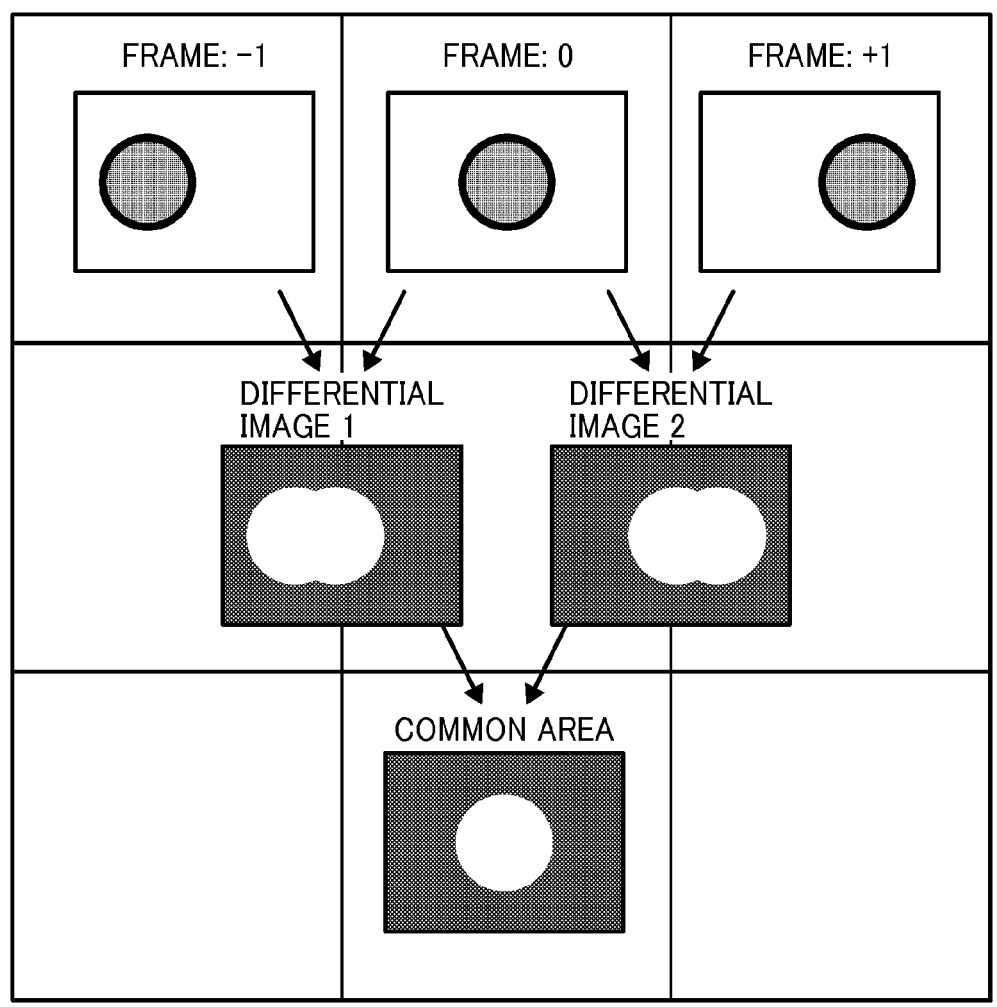
FIG. 4 is an explanatory diagram illustrating a concept of a moving region detection method of an imaging apparatus according to an embodiment of the present disclosure.

The moving object B is assumed to be moving rightward within an image capturing area A. Referring to FIG. 4, the description will be given of a detection method to be used in the moving region detection step S101 illustrated in FIG. 2, in a case in which the movement of the moving object B is captured in a moving image mode.

FIG. 4 is an explanatory diagram illustrating a concept of a moving region detection method of an imaging apparatus.

The description will now be given of a method for detecting a position of a moving region in a frame: 0. In the present embodiment, the differentiation technique is used for the detection.

First, in an upper row in FIG. 4, the image data of a frame: −1 and a frame: +1, which is preceding and subsequent frames of the frame: 0, respectively, is acquired.

Next, in a middle row in FIG. 4, two types of difference images, i.e., a difference image between the frame: −1 and the frame: 0, and a difference image between the frame: 0 and the frame: +1, are created. A threshold is set for a difference between luminance values of the respective corresponding pixels, and a region having a value equal to or greater than the threshold is extracted.

Finally, in a lower row in FIG. 4, based on the information of the two difference images, a region determined to have a value equal to or greater than the threshold in both of the difference images is extracted. The region obtained through such processing is acquired as a moving region in the frame: 0.

Second Embodiment

The second embodiment is an embodiment of color overlap correction to be performed in a case in which an imaging apparatus not fixed to a camera platform or the like captures an image of an object in a moving image mode.

In the present embodiment, since the imaging apparatus is not fixed to a camera platform or the like, an object and a background part moves together within an image capturing area. At this time, an optical flow of the entire video image region including the object and the background part is calculated for a focused frame. If a luminance value change between a pixel in the focused frame and a pixel in a preceding frame that are determined to be the same point is equal to or greater than a threshold, the pixels are determined to correspond to a specular reflection area that emits shine, and a color correction value is calculated.

In addition, a hardware configuration is similar to that illustrated in FIG. 1, so the description thereof will be omitted.

Figure 5:
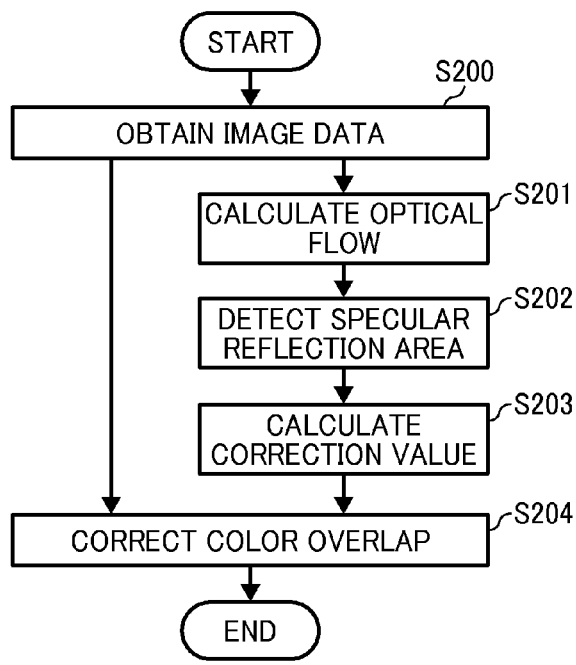
FIG. 5 is a flowchart illustrating operation of performing color overlap correction according to a second embodiment.

FIG. 5 is a flowchart of operation of performing color overlap correction according to the second embodiment.

The processing in this flow is executed on all frames in a moving image, so as to perform color overlap correction of the moving image.

In step S200, the CPU 5 acquires, as still images, the image data of a focused frame and an immediately preceding frame of the focused frame, from among consecutive frames of a moving image captured by an imaging unit.

In step S201, an optical flow between the above-mentioned two still images is calculated. In the optical flow calculation, a known gradient technique is employed. The gradient technique is premised on that a movement of a target object between two still images is minute. An optical flow (u, v) represents a movement amount of a pixel in 1/30 seconds, which is a frame interval as a minute time of a pixel, and is defined by Equation (1).

$$(u, v) = \left(\frac{\partial x}{\partial t}, \frac{\partial y}{\partial t}\right) \quad (1)$$

$$I_x u + I_y v + I_t = 0 \quad (2)$$

$$I_x + I_y + I_t = 0 \quad (3)$$

Here, the values of u and v for working out Equations (2) and (3) are calculated. $I_x$ and $I_y$ represent the gradient of a focused pixel between the two images, and $I_t$ represents a luminance value change of the pixel.

In step S202, it is determined, using the luminance value change between pixels determined to be the same point in step S201, whether the pixels corresponds to a specular reflection area. First, respective luminance values of the RGB channels are calculated for each of the pixels determined to be the same point, and an absolute value of a difference in luminance value between the pixels is calculated for each channel. A threshold is set for this absolute value, and if the absolute value of the difference in luminance value is equal to or greater than the threshold in all the channels, the pixels are determined to correspond to a specular reflection area. By performing such determination on the entire video, a specular reflection area in the still image can be detected.

In step S203, the sums $\Sigma R$, $\Sigma G$, and $\Sigma B$ of the luminance values of the respective channels, and color correction values R gain ($=\Sigma G/\Sigma R$) and B gain ($=\Sigma G/\Sigma B$) are calculated for each frame. More specifically, the respective values of the R gain and B gain are calculated and held for at most 10 frames. The average value of these values can be calculated as a color correction value.

The processing in step S204 is similar to the color correction value calculation step S106 and the color overlap correction execution step S107 described in the first embodiment. Thus, the description thereof will be omitted.

Third Embodiment

The third embodiment is an embodiment in an imaging apparatus that captures an image of an object in a still image mode, such as a still camera.

Figure 6:
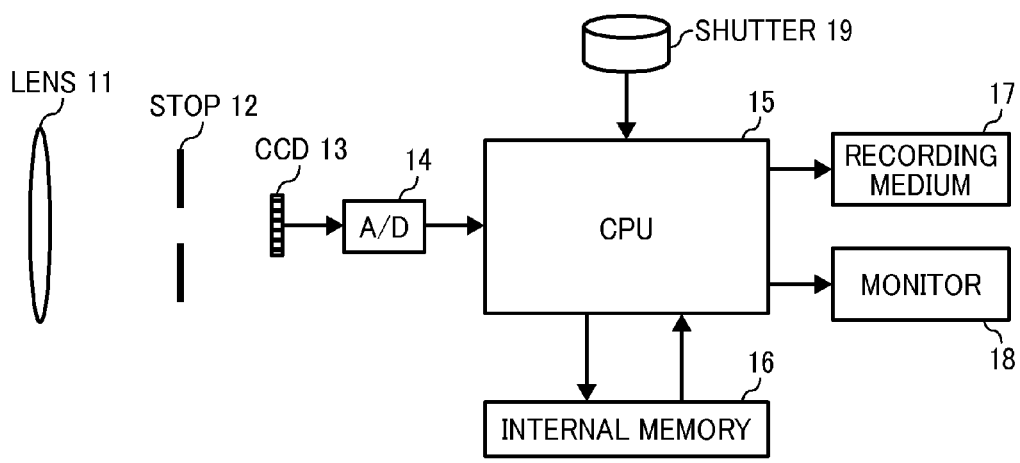
FIG. 6 is an explanatory diagram illustrating a hardware configuration of an imaging apparatus according to a third embodiment.

FIG. 6 is an explanatory diagram illustrating a hardware configuration according to the third embodiment.

In the present embodiment, for components identical to those in the hardware configuration according to the first embodiment as illustrated in FIG. 1, the descriptions will be omitted.

A monitor 18 is built in an imaging apparatus, and is used for a so-called preview function of displaying a video image within an image capturing area as a moving image until a shutter button 19 is pressed. At this time, a signal is read from a CCD sensor 13 at 30 fps, processed by an A/D converter 14 and a CPU 15, and displayed on the monitor 18.

When the shutter button 19 is pressed, upon completion of preview, an electric shutter is operated. Then, an electrical signal acquired at a desired exposure time is converted by the A/D converter 14 into a digital signal. The CPU 15 performs color overlap correction and the like on the signal, and the signal is output to a recording medium 17 and the monitor 18.

Figure 7:
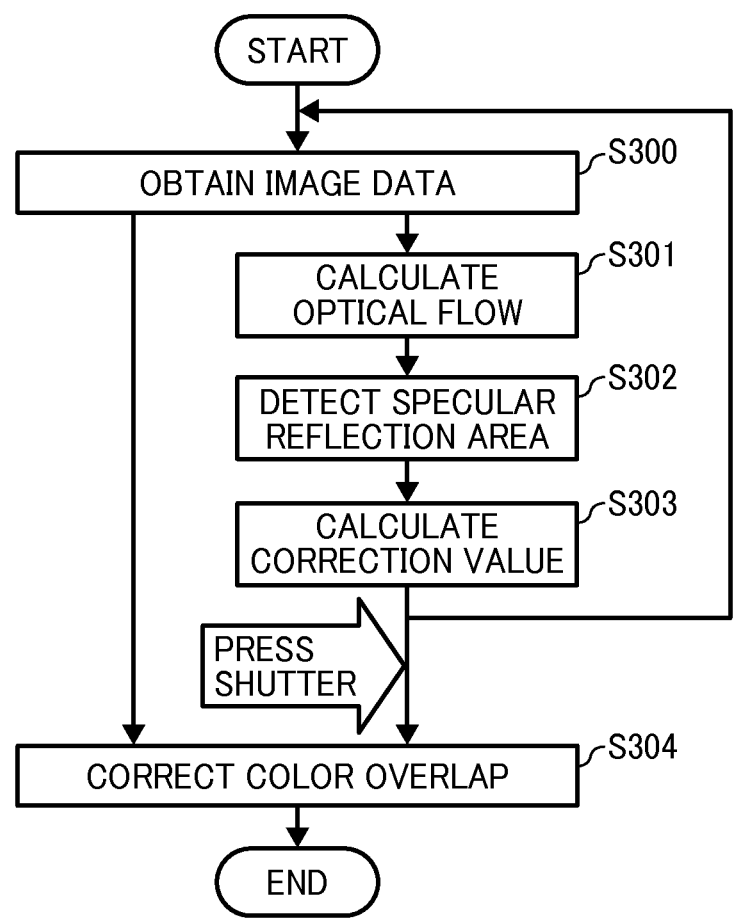
FIG. 7 is a flowchart illustrating operation of performing color overlap correction according to the third embodiment.

FIG. 7 is a flowchart illustrating operation of performing color overlap correction according to the third embodiment The processing flow according to the third embodiment is basically similar to the processing flow according to the second embodiment. Until the shutter button 19 is pressed, the processing in steps S300 to S303 is continued to be repeatedly executed on a preview moving image that is currently being acquired, so as to continue updating a color correction value to a latest value.

When the shutter button 19 is pressed, the latest color correction value calculated in step S303 and held in an internal memory 16 is read. In addition, the image data obtained when the shutter button 19 is pressed is transferred from an imaging unit to the CPU 15. Then in step S304, color overlap correction is executed.

As described above, a specular reflection area that emits shine of an object is detected from a captured moving image, and color overlap correction is executed based on the color information of this region. In a conventional color overlap correction method, a color correction value is calculated without distinguishing between specular reflection and diffuse reflection for light reflected from an object. Thus, influence of the object color of an object is large in the color overlap correction. Specular reflection light from an object has less influence of the object color of an object, as compared to diffuse light from an object. Thus, by using the color information of a specular reflection area, the color information of a light source that is illuminating an object can be accurately estimated. As a result, as for an imaging apparatus that can capture a moving image, if a light source color is accurately estimated using a captured image, stable color overlap correction can be executed on a captured moving image or still image.

In addition, as described above, highly-accurate color overlap correction can be executed on a still image.

In addition, there can be obtained such a technical effect that a threshold used for determining a specular reflection area is uniquely determined.

In addition, when different light sources are illuminating an object and a background part, accurate color overlap correction can be executed for the object.

In addition, when an imaging apparatus is fixed to a camera platform or the like, the detection accuracy of an object increases.

In addition, even when an imaging apparatus is not fixed to a camera platform or the like, an object can be effectively tracked.

The above-described imaging apparatuses according to the present disclosure are realized by programs for causing a computer to execute processing. One example of the computer is a CPU built in the imaging apparatus, but the present disclosure is not limited thereto. The description will be therefore given below of an example case in which a function of the present disclosure is realized by a program.

Examples of such a program include a program that is readable by a computer of the imaging apparatus and for correcting the color overlap of an image including a still image and a moving image, based on the color information of specular reflection light of a light source for illuminating an object. More specifically, examples of such a program include a program for causing a computer to execute a step of acquiring a video image by an imaging unit, a step of tracking, by an object tracker, a position of an object for an object within an image capturing area, from the video image acquired by the imaging unit, a step of recording a luminance change for an object region being tracked by the object tracker, and if a luminance change amount is equal to or greater than a threshold, detecting the point as a specular reflection area by a specular reflection area detector, a step of calculating, by an object correction value calculator, a correction value for correcting color overlap, based on the color information of the specular reflection area, and a step of correcting, by a color overlap corrector, color overlap of the video image based on the object correction value.

Such a program may be stored in a computer-readable recording medium.

<Recording Medium>

Here, examples of the recording medium include a computer-readable recording medium such as a compact disc read only memory (CD-ROM), a flexible disk (FD), and a CD recordable (CD-R), a semiconductor memory such as a flash memory, a random access memory (RAM), a ROM, and ferroelectric random access memory (FeRAM), and an HDD.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any recording medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An imaging apparatus, comprising:
   an imager configured to acquire an image including a still image and a moving image; and
   circuitry configured to correct color overlap of the image based on color information of specular reflection light illuminating an object, the circuitry being further configured to,
   track a position of the object within an image capturing area of a first frame of the image and a preceding frame of the image,
   record a luminance change within a region of the object being tracked in the image capturing area,
   detect a point in the first frame and the preceding frame having a luminance change amount equal to or greater than a threshold, as a specular reflection area,
   calculate an object correction value, which is a color correction value of the object, based on color information of the specular reflection area, and
   correct color overlap of the image based on the object correction value.

2. The imaging apparatus according to claim 1, further comprising:
   a memory configured to store, as correction data, an image previously acquired by the imager, before the image of the object is captured,
   wherein the circuitry executes color overlap correction on the stored correction data and a still image within the image capturing area that is captured by the imager.

3. The imaging apparatus according to claim 1,
   wherein, for detecting a specular reflection area, the circuitry previously measures angular dependency of a reflectance of a reference object, and determines the threshold based on a reflectance under a specular reflection condition and a reflectance under a diffuse reflection condition.

4. The imaging apparatus according to claim 1,
   wherein the circuitry calculates a background part correction value, which is a color correction value of a background part not determined to be the object, and
   wherein, in a case in which the object correction value and the background part correction value differ from each other by a certain value or more, the circuitry executes color overlap correction only on a region being tracked, using the object correction value.

5. The imaging apparatus according to claim 1,
   wherein the circuitry tracks the object on the image using a differentiation technique.

6. The imaging apparatus according to claim 1,
   wherein the circuitry tracks the object on the image using an optical flow.

7. A method of correcting color overlap of an image based on color information of specular reflection light of a light source for illuminating an object, the method comprising:
   acquiring an image including a still image and a moving image;
   tracking a position of the object within an image capturing area of a first frame of the image and a preceding frame of the image;
   recording a luminance change within a region of the object being tracked in the image capturing area;
   detecting a point in the first frame and the preceding frame having a luminance change amount equal to or greater than a threshold, as a specular reflection area;
   calculating an object correction value, which is a color correction value of the object, based on color information of the specular reflection area; and
   correcting color overlap of the image based on the object correction value.

8. A non-transitory recording medium which, when executed by one or more processors, cause the processors to perform a method of correcting color overlap of an image based on color information of specular reflection light of a light source for illuminating an object, the method comprising:
   acquiring an image including a still image and a moving image;
   tracking a position of the object within an image capturing area of a first frame of the image and a preceding frame of the image;
   recording a luminance change within a region of the object being tracked in the image capturing area;

detecting a point in the first frame and the preceding frame having a luminance change amount equal to or greater than a threshold, as a specular reflection area;

calculating an object correction value, which is a color correction value of the object, based on color information of the specular reflection area; and correcting color overlap of the image based on the object correction value.

* * * * *